US006667273B1

(12) United States Patent
Cullen et al.

(10) Patent No.: US 6,667,273 B1
(45) Date of Patent: Dec. 23, 2003

(54) COMPOSITION FOR ABSORBING OXYGEN IN AN OXYGEN/CARBON DIOXIDE ENVIRONMENT

(75) Inventors: John S. Cullen, Buffalo, NY (US); George E. McKedy, Williamsville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 904 days.

(21) Appl. No.: 09/174,977

(22) Filed: Oct. 19, 1998

Related U.S. Application Data

(63) Continuation of application No. 08/088,405, filed on Jul. 7, 1993, now abandoned, which is a continuation of application No. 07/827,978, filed on Jan. 30, 1992, now abandoned.

(51) Int. Cl.$^7$ ............................................. C09K 15/00
(52) U.S. Cl. ................................ 502/406; 252/188.28
(58) Field of Search .................. 252/188.25, 188.28; 426/118, 124, 129, 133; 95/138; 502/406

(56) References Cited

U.S. PATENT DOCUMENTS

| | | | |
|---|---|---|---|
| 1,821,388 A | 9/1931 | Maude et al. | 252/188.28 |
| 3,370,915 A | 2/1968 | Sperberg | 252/188.28 |
| 4,127,503 A | 11/1978 | Yoshikawa et al. | 252/188.28 |
| 4,166,807 A | 9/1979 | Komatsu et al. | 252/188.28 |
| 4,192,773 A | 3/1980 | Yoshikawa et al. | 252/188.28 |
| 4,230,595 A | 10/1980 | Yamaji et al. | 252/188.28 |
| 4,299,719 A | 11/1981 | Aoki et al. | 252/188.28 |
| 4,384,972 A | 5/1983 | Nakamura et al. | 252/188.21 |
| 4,406,813 A | 9/1983 | Fujishima et al. | 252/188.28 |
| 4,510,162 A * | 4/1985 | Nezat | 252/188.28 |
| 4,524,015 A | 6/1985 | Takahashi et al. | 252/188.28 |
| 4,588,561 A | 5/1986 | Aswell et al. | 422/238 |
| 4,762,722 A | 8/1988 | Izumimoto et al. | 426/124 |
| 4,992,410 A | 2/1991 | Cullen et al. | 502/407 |

FOREIGN PATENT DOCUMENTS

| | | |
|---|---|---|
| JP | 84538 | 6/1980 |
| JP | 106580 | 8/1981 |
| JP | 212327 | 9/1986 |

* cited by examiner

Primary Examiner—Stuart L. Hendrickson
(74) Attorney, Agent, or Firm—Joseph P. Gastel

(57) ABSTRACT

A composition for absorbing oxygen and releasing carbon dioxide in a high moisture environment including by weight an iron-based component for absorbing oxygen in an amount of between about 15% and 60%, a carbon dioxide releasing component for releasing carbon dioxide in an amount of between about 8% and 50%, an acidifying component for providing acid for activating the carbon dioxide releasing component, and a dry water-attracting component for preventing premature activation of the iron-based component and carbon dioxide releasing component and for attracting water from a high moisture environment to thereby supply water for activating the acidifying component and the iron-based component. A method of absorbing oxygen and releasing carbon dioxide in a container having a product and a high moisture environment and wherein oxygen was flushed out and replaced by at least 26% carbon dioxide and the remaining atmosphere in the container having 17% or less oxygen content after the flushing and into which additional oxygen may have entered including the steps of providing a container, placing a product into the container, flushing the container with a gas containing carbon dioxide, and inserting into the container a packet containing the above described composition.

9 Claims, No Drawings

COMPOSITION FOR ABSORBING OXYGEN IN AN OXYGEN/CARBON DIOXIDE ENVIRONMENT

This is a continuation of application Ser. No. 08/088,405 filed Jul. 7, 1993 now abandoned, which is a continuation of Ser. No. 07/827,978, filed Jan. 30, 1992 now abandoned.

BACKGROUND OF THE INVENTION

The present invention relates to a composition for and a method of absorbing oxygen and releasing carbon dioxide in a container having a product and a high moisture environment from which oxygen was flushed and which contains carbon dioxide and some oxygen.

In certain packaging procedures, a gas flush containing carbon dioxide is utilized to replace oxygen which may have a deteriorating effect on the product within a container. Most gas flushing methods leave between about 0.5% to 2% oxygen in the container. In environments of this type, compositions which absorb oxygen and also generate carbon dioxide are used to absorb oxygen which may have remained in the container or which may leak into the container or which may be generated by the product in the container. It has been found that merely using an oxygen absorber without a carbon dioxide generator does not operate satisfactorily because the oxygen is not absorbed rapidly or sufficiently. For some unexplained reason the generation of carbon dioxide hastens the time and quantity of oxygen absorption. The carbon dioxide which is generated replaces oxygen which is absorbed. However, prior compositions for absorbing oxygen were not stable in that they released carbon dioxide prematurely, that is, before they were placed into their operating environment within the container.

SUMMARY OF THE INVENTION

It is the object of the present invention to provide an improved composition for absorbing oxygen and generating carbon dioxide in a container having a product and high moisture and which has had a flush with a gas containing carbon dioxide and which is extremely stable so that it will not become active to release carbon dioxide prematurely, that is, until it is placed into the container having the high moisture environment.

Another object of the present invention is to provide an improved method for absorbing oxygen and generating carbon dioxide in a container having a product and a high moisture content and which has had a flush with a gas containing carbon dioxide. Other objects and attendant advantages of the present invention will readily be perceived hereafter.

The present invention relates to a composition for absorbing oxygen and releasing carbon dioxide in a high moisture environment comprising by weight an iron-based component in an amount of between about 15% and 60%, a carbon dioxide releasing component in an amount of between about 8% and 50%, an acidifying component, and a dry water-attracting component for attracting moisture from the high moisture environment to thereby activate the iron-based component to absorb oxygen and also activate the acidifying component to combine with said carbon dioxide releasing component to cause it to release carbon dioxide.

The present invention also relates to a method of removing oxygen from a container having a product and a high moisture environment and wherein oxygen was previously flushed out and replaced by a gas containing carbon dioxide and wherein some oxygen may have remained and into which additional oxygen may have entered and which exists as a relatively small percentage of the total volume of the gas containing carbon dioxide and oxygen comprising the steps of providing a container, placing a product into said container, flushing the container with a gas containing carbon dioxide to remove other gases from said container, and providing in said container a mixture of an oxygen-absorbing component, a carbon dioxide generating component, an acidifying component, and a dry water-attracting component for attracting moisture from the high moisture environment to thereby activate said oxygen-absorbing component to absorb said additional oxygen and also activate said acidifying component to combine with said carbon dioxide releasing component to cause it to release carbon dioxide.

The various aspects of the present invention will be more fully perceived from the following portions of the specification.

DESCRIPTION OF THE PREFERRED EMBODIMENTS

As noted briefly above, in certain prior packaging applications, after a product has been placed in a container, a flush with a gas containing carbon dioxide is used to replace oxygen which may have a deteriorating effect on the product within the container. This gas may be pure carbon dioxide or a mixture of carbon dioxide and nitrogen. Thereafter, a combined oxygen-absorbing and carbon dioxide generating composition is placed into the container to absorb oxygen which may have remained in the container or which may leak into or be formed in the container. The generated carbon dioxide replaces at least part of the oxygen which is absorbed. However, insofar as known, prior compositions were not stable in that they released carbon dioxide prematurely, that is, before they were placed into their operating environment. In order to overcome the foregoing deficiency, the improved method of the present invention utilizes a composition which adds a dry water-attracting component to the oxygen-absorbing component and the carbon dioxide releasing component. The dry water-attracting component stabilizes the composition against premature activity, that is, before it is placed into its high moisture environment. For some unknown reason, in an environment of the above type, the use of an oxygen absorber by itself without a carbon dioxide generator will not absorb the oxygen as quickly and as fully as when a carbon dioxide generator is also used.

In the practice of the improved method a product is added to a container, and the gases in the container are flushed out with a gas containing carbon dioxide to the extent that the carbon dioxide content of the container is at least 20% with the remaining atmosphere in the container containing less than about 17% oxygen and usually between about 0.5% to 2% oxygen. There-after, as part of the method, the improved composition of the present invention is added for absorbing any oxygen which remains in the container or which leaks into the container or is generatd by the product in the container. The composition is extremely stable in that it will not become active until the moisture within the container is adsorbed by a dry moisture-attracting component of the composition, and thus the composition cannot be activated prematurely. The product in the container may be a food such as meat, fish, coffee, bread and cheese, or any other food product, or any other product which may be deleteriously affected by oxygen.

The oxygen-absorbing component of the improved composition is preferably particulate iron which is blended with powdered sodium chloride, which functions as an electrolyte when it combines with water. The particulate iron may be present in the composition by weight in an amount of between 15% and 60% and preferably between 20% and 40% and most preferably between 25% and 35%. The iron in the presence of an electrolyte will combine with the oxygen from the environment. The particle size of the iron can be between 30 and 635 mesh and preferably between 100 mesh and 375 mesh and most preferably between 200 mesh and 325 mesh. While particulate iron is preferred, other iron based components can be used including but not limited to iron II sulfate, iron II oxide, iron II carbide and iron carbonyl. When pure iron is used it may be of any type. Aluminum, copper, zinc and other oxidizable metals can be used.

The composition includes an electrolyte material. One which is preferred is sodium chloride and it should be in the same range of particulate sizes as discussed above relative to the iron. The sodium chloride may be present in an amount of between about 0% and 3½% and preferably between about 2% and 2½%. Above 3½% no increase in the reaction rate occurs. At 0% sodium chloride, the reaction is slower than if sodium chloride was present because the other salts which exist in the composition, namely, the sodium bicarbonate, will function as an electrolyte, but not as effectively. The exact amount of sodium chloride is not critical, but it is best to have the above preferable amount present. Other equivalent salts may be substituted for the sodium chloride which include without limitation calcium chloride, sodium bromide, potassium chloride, calcium iodide, magnesium chloride, barium chloride, magnesium sulfate, potassium nitrate, potassium phosphate, potassium hypophosphate, sodium carbonate and potassium carbonate. However, sodium chloride, potassium iodide, potassium bromide, calcium chloride, and magnesium chloride are preferred.

Another component of the improved composition is one which will generate carbon dioxide gas when it is subjected to an acid environment, and one such preferred component is sodium bicarbonate which may be present in the composition by weight in an amount of between 8% and 50%, and preferably between 10% and 39% and most preferably between 15% and 22%. While sodium bicarbonate is preferred, any suitable carbonate or bicarbonate may be used including, without limitation, the carbonates or bicarbonates of lithium, magnesium, and potassium. The carbon-generating components may be present in chemically equivalent amounts set forth above for the sodium bicarbonate. The carbon dioxide generating component can be of any suitable particle size within the same range of particle sizes as the iron listed above.

Another component of the the improved composition is an acid. Fumaric acid is preferred and it may be present in the composition by weight in an amount of between 10% and 60%, and preferably between 20% and 45% and most preferably between 27% and 40%. While fumaric acid is preferred, any carboxylic acid (mono or di or tricarboxylic acids included) or other compound that acts as an acid upon contact with water may be used. This would include without limitation phosphoric acid and tartaric acid, potassium bisulfate and erythorbic acid. The acid, as noted briefly above, reacts with carbonate or bicarbonate to generate carbon dioxide. The fumaric acid or other acid which is used should be as dry as possible to avoid premature reactions. The dryness should be less than about 1% moisture by weight. All of the acids may be present in the chemically equivalent amounts as listed above for the preferred fumaric acid.

The improved composition contains a dry water-attracting component which is preferably dry silica gel. However, other water-attracting components may be used and these include without limitation diatomaceous earth, perlite, zeolite, activated alumina, activated carbon, sand, salt, activated clay, molecular sieve, and cellulose or other natural polymers. The dry water-attracting component prevents premature activation of the carbon dioxide releasing component and the oxygen-absorbing component. In its operating environment the water-attracting component attracts moisture from the container (1) so that an electrolyte will be formed when the water combines with the salt to activate the oxygen-absorbing component and (2) so that a liquid acid will be formed to react with the carbonate or bicarbonate to generate carbon dioxide substantially simultaneously with the absorption of the oxygen by the oxygen-absorbing component.

The silica gel should be dry. In this respect, it should preferably not exceed 5% of moisture and more preferably should not exceed 3% of moisture and most preferably should not exceed 2% of moisture. When the moisture content of the silica gel is less than 5%, the composition will not prematurely release carbon dioxide, nor will the salt form an electrolyte. This gives this composition excellent stability compared to earlier formulations. It is believed that premature release of carbon dioxide and premature generation of oxygen are prevented by the dry silica gel because it absorbs moisture more readily than the acid and the salt, and thus prevents formulation of liquids which would react with the carbon dioxide releasing component and the oxygen-absorbing component.

It is to be especially noted that if a moist water-attracting component is used in the composition, rather than a dry one, even in an oxygen free atmosphere, it will supply moisture to the acid and to the salt so that they can react with the carbon dioxide releasing agent and the oxygen-absorbing component to thus release carbon dioxide and absorb oxygen prematurely, that is, before the composition is placed into its operating environment. It is therefore important that the water-attracting component should be dry to prevent premature activation of the oxygen-absorbing and carbon dioxide releasing components. The silica gel may be present in the composition by weight in an amount of between 1% and 70%, and more preferably between 4% and 30% and most preferably between 10% and 25%. The particle size of the silica gel is not critical. The other water-attracting components listed above may be present in the same amounts as set forth for the silica gel.

The oxygen-absorbing and carbon dioxide generating composition described above is preferably prepared by mixing the ingredients in the proper proportions in a closed container and retaining the composition therein until it is placed into packets which are sealed. However, the ingredients can be mixed under existing ambient atmospheric temperature and humidity conditions before placing required amounts into packets which are sealed, provided that the composition is not subjected to the existing ambient humidity for a sufficiently long time to absorb sufficient moisture to activate the oxygen-absorbing and carbon dioxide generating reactions. The sealed packets are thereafter inserted into containers from which air has been flushed by a gas containing carbon dioxide and then sealed. The packets are preferably fabricated from a spun-bonded polyolefin, known under the trademark TYVEK of the DuPont Company, which will pass gases including oxygen and water vapor but will not pass liquid water, or they can be made of any other suitable material consistent with the contents of the containers. The packets can be of any desired form including the form shown in U.S. Pat. No. 4,992,410.

When the components of the composition are mixed while the water-attracting component is dry, the composition will not react to either absorb oxygen from the atmosphere or generate carbon dioxide to the atmosphere. It is only after the composition is placed in a container or environment containing sufficient moisture that the water-attracting component will attract moisture and thus provide sufficient water to initiate the above-described reactions. Thus, the composition is stable until it is placed into its operating environment. As noted above, the water-attracting component has a greater affinity for water vapor than the other components, and this is the factor which prevents premature activation of the composition.

A preferred composition which has been formulated includes by weight about 30% of particulate iron having about 2% of sodium chloride, about 19% of dry silica gel having less than about 3% moisture, about 18% of sodium bicarbonate, and about 33% fumaric acid.

The following examples have been made in the laboratory for testing the oxygen absorption.

EXAMPLE I

A formulation was used which contained 0.85 grams (30%) of 100 mesh powdered iron blended with 325 mesh 2.0% by weight of sodium chloride, 0.51 grams (18%) of 0.3 mm silica gel with no moisture added (actual moisture content by weight of the silica gel was 1.7%), 0.52 grams (18%) of powdered 325 mesh sodium bicarbonate and 0.94 grams (33%) powdered 325 mesh fumaric acid. This mixture was blended in a closed container and placed in a TYVEK envelope which was heat-sealed. This TYVEK envelope was 2" by 1½" and it was placed in a jar with a 1" by 5" piece of blotter paper saturated with water to act as a product with a moisture source. This container had a volume of 2 gallon and it originally had an atmosphere of 1.8% oxygen (8.7%) and 91.3% carbon dioxide. The rate of oxygen absorption was the following:

|  | Amount of oxygen absorbed | Level of oxygen inside the container |
| --- | --- | --- |
| 24 hours | 52 cc | 1.25% |
| 48 hours | 83 cc | 0.92% |
| 72 hours | 101 cc | 0.41% |
| 168 hours | 170 cc | 0.00% |

A MOCON oxygen analyzer was used to determine the oxygen levels. The dioxide which was generated was not measured but it replaced at least some of the oxygen.

EXAMPLE II

A formulation was used which had the same mesh sizes as set forth in Example I. It contained 0.85 grams (30%) of powdered iron blended with 2.0% sodium chloride by weight, 0.51 grams (18%) of silica gel with 1.0% moisture added to the silica gel (the actual moisture content of the silica gel was 2.7%), 0.52 grams(18%) of powdered sodium bicarbonate and 0.94 grams (33%) of powdered fumaric acid. This mixture was blended in a closed container and placed in a TYVEK envelope which was heat-sealed. This envelope was placed in a 2-gallon container which was then made air tight. Placed in the container with the TYVEK envelope was a 1" by 5" piece of blotter paper saturated with water to act as a product with a moisture source. This container originally had an atmosphere of 7.2% oxygen (34.6% air) and 65.4% carbon dioxide. The rate of oxygen absorption was the following:

|  | Amount of oxygen absorbed | Level of oxygen inside the container |
| --- | --- | --- |
| 24 hours | 63 cc | 6.4% |
| 48 hours | 110 cc | 5.9% |
| 72 hours | 149 cc | 5.4% |
| 168 hours | 220 cc | 4.6% |

A MOCON oxygen analyzer was used to determine the oxygen levels. The carbon dioxide which was generated was not measured but it replaced at least some of the oxygen.

EXAMPLE III

A formulation was used which had the same mesh sizes as set forth in Example I. It contained 0.85 grams (30%) of powdered iron blended with 2.0% by weight of sodium chloride, 0.51 grams (18%) of silica gel with 3.0% moisture added to the silica gel (the actual moisture content of the silica gel was 4.7%), 0.52 grams (18%) of powdered sodium bicarbonate and 0.94 grams (33%) of powdered fumaric acid. This mixture was blended in a closed container and put into a TYVEK envelope which was heat-sealed and then put into a 2-gallon container which was then made air tight. Present in the container with the envelope was a 1" by 5" piece of blotter paper saturated with water to act as a product with a moisture source. This airtight container originally had an atmosphere of 4.8% oxygen (23.1% air) and 76.9% carbon dioxide. The rate of oxygen absorption was the following:

|  | Amount of oxygen absorbed | Level of oxygen inside the container |
| --- | --- | --- |
| 24 hours | 51 cc | 4.2% |
| 48 hours | 97 cc | 3.6% |
| 72 hours | 146 cc | 3.0% |
| 168 hours | 200 cc | 2.4% |

A MOCON oxygen analyzer was used to determine the oxygen levels. The carbon dioxide which was generated was not measured but it replaced at least some of the oxygen.

EXAMPLE IV

A formulation was used which had the same mesh sizes as set forth in Example I. It contained 1.5 grams (36%) of powdered iron blended with 2.0% by weight of sodium chloride, 1.2 grams (29%) of silica gel without any water added (the actual moisture content was 1.7%), 0.52 grams (12.5%) of powdered sodium bicarbonate and 0.94 grams (22.6%) of powdered fumaric acid. This mixture was blended in a closed container and placed in a TYVEK envelope which was heat-sealed. This envelope was placed in a 2-gallon container which was then made air tight. Placed in the container with the TYVEK envelope was a 1" by 5" piece of blotter paper saturated with water to act as a product with a moisture source. This container originally had an atmosphere of 7.3% oxygen (35.1% air) and 64.9% carbon dioxide. The rate of oxygen absorption was the following:

| | Amount of oxygen absorbed | Level of oxygen inside the container |
|---|---|---|
| 24 hours | 68 cc | 6.5% |
| 48 hours | 125 cc | 5.8% |
| 72 hours | 202 cc | 4.9% |
| 168 hours | 337 cc | 3.2% |

A MOCON oxygen analyzer was used to determine the oxygen levels. The carbon dioxide which was generated was not measured but it replaced at least some of the oxygen.

The above description has referred to the flushing gas as a gas containing carbon dioxide. This gas can be pure carbon dioxide or a mixture of carbon dioxide and nitrogen, as noted briefly above, and the present composition and method will function satisfactorily with either.

The following tests were made to determine the stability of the oxygen absorbing composition:

EXAMPLE V

A composition was made containing 140 grams of 100 mesh iron having 2% by weight of sodium chloride, 84 grams of silica gel having 1.69% moisture in the silica gel, 84 grams of sodium bicarbonate and 155 grams of fumaric acid. This composition was exposed to 140° F. temperature for seven days and no carbon dioxide was given off.

EXAMPLE VI

The same composition was made as in Example V except that 2.5% by weight of moisture was added to the silica gel giving it a total moisture content of 4.19%. This composition was exposed to 140° F. temperature for seven days and no carbon dioxide was given off.

EXAMPLE VII

The same composition was made as in Example V except that 5.0% of water by weight was added to the silica gel giving it a total moisture content of 6.69% and the following was observed. After one day at 140°F. no carbon dioxide was given off. After two days at 140° F., a slight amount of carbon dioxide was given off. After four days at 140° F., slightly more carbon dioxide was given off, and after seven days at 140° F., still more carbon dioxide was given off.

EXAMPLE VIII

The same composition was made as in Example V except that 10% of water by weight was added to the silica gel to give it a total moisture content of 11.69%. After one day at 140° F. a good amount of carbon dioxide was given off and progressively more carbon dioxide was given off after two days, four days and seven days.

EXAMPLE IX

A composition was tested which was the same as that of Example V except that 20% by weight of moisture was added to the silica gel for a total moisture content of 21.69% and it was observed that after one day at 140° F., considerable carbon dioxide had been given off.

In Examples V–IX, the 140° F. was used to simulate a longer storage time. The ability not to prematurely give off carbon dioxide is important in that the composition loses its ability to absorb oxygen as it gives off carbon dioxide. Therefore, the longer that carbon dioxide generation is avoided, the longer the composition remains potent. With dry silica gel the absorber will also be more stable in regard to oxygen absorption because there is not enough moisture present to initiate the oxygen-absorbing reaction. It is only after the silica gel has adsorbed sufficient quantities of moisture that the oxygen-absorbing reaction will be initiated.

While preferred embodiments of the present invention have been disclosed, it will be appreciated that it is not limited thereto but may be otherwise embodied within the scope of the following claims.

What is claimed is:

1. In a sealed container which contains a product which may be deleteriously affected by oxygen and which contains oxygen and carbon dioxide as a result of a carbon dioxide flush and which has a high moisture content, the improvement of a stable composition for absorbing oxygen and releasing carbon dioxide but which will not absorb oxygen and release carbon dioxide until after it has been placed in said high moisture container which is subsequently sealed comprising by weight an iron-based component in an amount of between about 15% and 60%, a carbon dioxide releasing component in an amount of between about 8% and 50%, a solid electrolyte material, a dry acidifying component, and dry water-attracting means containing not more than about 3% moisture for maintaining said stable composition dry until it is placed into said high moisture container and thereafter adsorbing moisture from said high moisture content of said sealed container and providing said moisture to both said solid electrolyte material and said dry acidifying component to thereby activate said solid electrolyte material to combine with said iron-based component to absorb oxygen and also activate said acidifying component to combine with said carbon dioxide releasing component to cause it to release carbon dioxide, said activation of said solid electrolyte material and said dry acidifying component occurring only after said dry water-attracting means adsorbs sufficient of said moisture from said sealed container thus avoiding premature activation of said oxygen-absorbing component and said carbon dioxide releasing component.

2. In a container as set forth in claim 1 wherein said iron-based component is present in an amount of between about 20% and 40% and wherein said carbon dioxide releasing component is present in an amount of between about 10% and 39%.

3. In a container as set forth in claim 1 wherein said iron-based component is present in an amount of between about 25% and 35% and wherein said carbon dioxide releasing component is present in an amount of between about 15% and 22%.

4. In a container as set forth in claim 1 wherein said dry moisture-attracting component is selected from the group consisting of silica gel, diatomaceous earth, perlite, zeolite, activated alumina, activated carbon, activated clay, molecular sieve, and cellulose.

5. In a container as set forth in claim 4 wherein said iron-based component is selected from the group consisting of particulate iron, iron II sulfate, iron II oxide, iron II carbide, and iron carbonyl.

6. In a container as set forth in claim 1 wherein said iron-based component is selected from the group consisting of particulate iron, iron II sulfate, iron II oxide, iron II carbide, and iron carbonyl.

7. In a container as set forth in claim 1 wherein said dry water-attracting component is present by weight in an amount of between about 1% and 70%.

8. In a container as set forth in claim 2 wherein said dry water-attracting component is present by weight in an amount of between about 4% and 30%.

9. In a container as set forth in claim 3 wherein said dry water-attracting component is present by weight in an amount of between about 10% and 25%.

* * * * *

UNITED STATES PATENT AND TRADEMARK OFFICE
CERTIFICATE OF CORRECTION

PATENT NO. : 6,667,273 B1
DATED : December 23, 2003
INVENTOR(S) : John S. Cullen and George E. McKedy It is certified that error appears in the above-identified patent and that said Letters Patent is hereby corrected as shown below:

<u>Column 5,</u>
Line 38, change "(8.7%)" to -- (8.7% air) --.
Line 52, change "dioxide" to -- carbon dioxide --.

Signed and Sealed this

Sixth Day of April, 2004

JON W. DUDAS
*Acting Director of the United States Patent and Trademark Office*